Patented Feb. 2, 1937

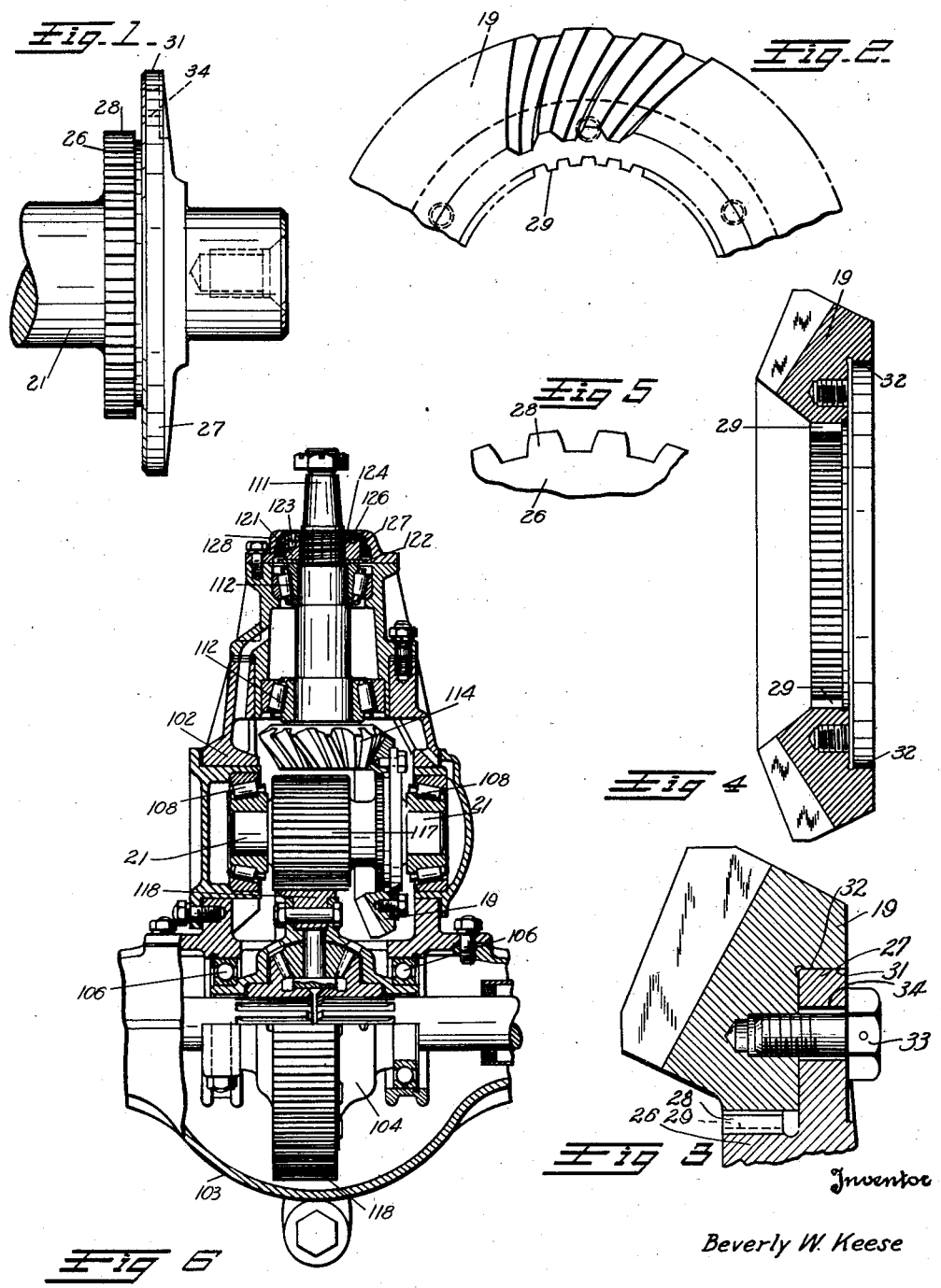

2,069,411

UNITED STATES PATENT OFFICE 2,069,411

GEAR MOUNTING FOR AXLE DRIVES AND THE LIKE

Beverly W. Keese, Oshkosh, Wis., assignor to The Timken-Detroit Axle Company, Detroit, Mich., a corporation of Ohio Application December 2, 1933, Serial No. 700,719

8 Claims. (Cl. 287—52.05)

This invention relates to drive gearing and is particularly directed to an axle drive of the double reduction type for use on motor vehicles.

In drive mechanisms of the usual double reduction type, a cross shaft having a bevel gear is provided as a part of the first speed reducer unit. A bevel pinion on the drive shaft meshes with the bevel gear, while any suitable gearing may be provided between the cross shaft and the differential.

A primary object of my invention is to provide an improved cross shaft gearing.

Prior to my invention various means have been provided for mounting the bevel gear on the cross shaft. In some of these prior arrangements the bevel gear has been made integral with the cross shaft, while in others the bevel gear has been splined directly to the cross shaft. In still other arrangements a two piece gear is provided in which a ring gear is mounted on an enlarged hub or flange on the shaft.

Accordingly, it is a major object of my invention to provide an improved construction for mounting a bevel ring gear on the cross shaft of a speed reducing mechanism.

A more specific object of my invention is to provide a means for mounting a gear upon a driven member whereby the mounting means reenforces the gear at the tooth pressure center.

The accomplishment of the above and other objects of my invention will appear from the following description and drawing, in which Figure 1 is a detail view of one end of the cross shaft showing the driving and piloting flanges.

Figure 2 is a detail view of the detachable bevel gear ring.

Figure 3 is an enlarged view of a section of the bevel ring gear assembly showing its driving and piloting flanges engaging the ring gear.

Figure 4 is a cross sectional view showing the relative positions of the engaging surfaces of the ring gear.

Figure 5 is an enlarged detail view showing the involute splines on the driving flange of the cross shaft.

In Figure 6 a horizontal double reduction type of final drive mechanism is shown as illustrative of a type of gearing in which my improved bevel ring gear mounting may be advantageously used. A conventional speed reducer housing carrier 102, is bolted or otherwise suitably secured to differential housing 103. A conventional differential mechanism 104 is journalled in the housing carrier 102 by means of antifriction bearings 106. The cross shaft 21 is journalled in bearings 108, while a drive shaft 111 is journalled in bearings 112. Power is delivered to the drive shaft 111 in any well known manner. Bevel pinion 114, which is fixed to shaft 111, transmits torque to the cross shaft 21 through bevel gear 19. Gear 19 is splined and mounted on the cross shaft 21 in accordance with my improved mounting as more clearly appears from Figures 1 to 5 and the detailed description thereof. Spur gear 117, which is fixed on the cross shaft 21, meshes with a ring gear 118 carried by the differential 104.

The foreward bearing of drive shaft 111 is held in adjusted position by means of a nut 121 and a washer 122. The nut 121 has a smooth external surface concentric with the threads on the shaft. Means for adjusting the nut are provided through holes 123. An external locking nut 124, which is similar in construction to that of the adjusting nut, is screwed against the adjusting nut 121 and locked thereto by means of a set screw 126 engaging the outer surface of the adjusting nut. A washer 127, which may be of felt or any other suitable material, is held in engagement with the adjusting nut by a sealing cover 128 for the purpose of excluding dirt and dust.

The cross shaft 21 has an inner flange 26 and an outer flange 27 as shown in Figures 1 and 3. Flange 26 carries involute splines 28 which engage complementary splines 29 on the inner periphery of the bevel gear 19. The outer flange 27 has a smooth annular piloting surface 31 which engages an annular recess 32 in bevel gear 19. The bevel ring gear is held firmly against the inner surface of the outer flange 27 by means of cap screws 33.

With special reference to Figure 3, in connection with Figures 1, 2, 4 and 5, the holes 34 in the outer flange 27, through which the cap screws 33 engage the bevel ring gear 19, are slightly larger than the diameter of the cap screws. This clearance permits the ring gear to center itself on the pilot, thereby eliminating any stress or distortion in the gear when the cap screws are tightly screwed into gear 19.

The clearance holes prevent the cap screws 33 from being subjected to shearing stresses and allows the splines on the inner flange to transmit all the torque. The clearance holes also allow for any possible errors in mating with the corresponding threaded holes due to any off-center of the splines with respect to the holes. Any expansion or contraction of the ring gear will not cause any distortion thereof because the ring may be said to "float" on the pilot. The ring gear engages the piloting surface 31 at points which are substantially opposite the center of the face of the bevel teeth. This greatly strengthens the ring gear and eliminates the tendency of the bevel gear 114 and the ring gear 19 to spring apart when under load, since the piloting surface is substantially on the tooth pressure center. It is to be noted that the retaining cap screws are located in the gear 19 between the piloting surface and the splines. By this arrangement the splines may be of maximum width without unnecessarily increasing the amount of material in the gear, and the holes in the ring gear are not located in the portion of the gear receiving the greatest thrust. At the same time the piloting flange receives the greater portion of the thrust due to the meshing of the gear 19 with the bevel gear 114. As indicated by dotted lines in Figure 3, there is an appreciable radial clearance between the roots of one set of splines and the tips of the complementary set of splines. This slight clearance is primarily designed to insure that the gear will be located entirely by the piloting flange, and it also allows for slight variations in machining and for contraction and expansion of the parts without jamming and distortion.

The external splines 28 (Figure 5) on the shaft 21 and the complementary internal splines 29 (Figure 2) on the ring gear 19 are cut in the form of an involute curve. A better engagement is assured by the use of involute splines. A line contact is obtained with the splines so shaped, while with the use of straight sided splines only point contact is assured. One of the reasons for the advantage secured by the involute form is that greater accuracy is possible in forming involute splines than in producing straight sided splines.

From the foregoing description it will be apparent that I have provided a novel method of mounting a bevel gear on a speed reducer cross shaft wherewith a gear of maximum strength and minimum weight may be used. By providing a cross shaft having a driving flange for transmitting torque and a piloting flange for carrying the bevel gear, the thrust due to the meshing of the gears is supported by the piloting flange. By making the diameter of the piloting flange greater than that of the driving flange, greater piloting and driving surface is provided without increasing the weight of the unit. The piloting surface being near the center of the gear tooth pressure reenforces the gear. Through the location of the cap screws between the piloting surface and the driving surface the gear is not weakened at the points of greatest stress. It will be noted that the provision of clearance holes in the piloting flanges allows small relative movement of the gear and flange and for small machining inaccuracies yet prevents the cap screws from causing high stresses in the gear. The provision of the clearance holes assures that all the transmitted torque is carried by the splines. By providing involute splines the torque stress is evenly distributed on the splined surfaces. The provision of the novel mounting means in combination with the other novel features of my invention contribute to form an efficient mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is: —

1. In combination, a shaft member having a plurality of radial flanges of different diameters, a ring gear adapted to engage said flanges and adapted to mesh with a bevel pinion, means on one of said flanges for non-rotatably fixing said flange to said ring gear, means on another of said flanges for rotatably engaging said ring gear, said last mentioned means being located at a greater distance from the center of said shaft member than the first mentioned means, and located substantially opposite the tooth pressure center of said ring gear.

2. In combination, a shaft member, a flange on said shaft member, splines on the outer periphery of said flange, a second flange on said shaft member adjacent said first flange, a smooth piloting surface on the periphery of said second flange, a ring gear adapted to engage both of said flanges, means for securing said ring gear to said flanges in such manner that any driving torque is transmitted solely through said splines, said means being operable to hold said ring gear against a surface of said second flange.

3. In combination, a shaft member having an inner and an outer integral flange, said outer flange having a considerably greater diameter than said inner flange, splines on the periphery of the inner flange, a smooth piloting surface on the periphery of said outer flange, a ring gear adapted to engage said flanges, means engaging the ring gear radially intermediate the periphery of said outer flange and the periphery of said inner flange to hold said ring gear against the outer flange, said piloting surface of said outer flange engaging said ring in a circular region located substantially opposite the center of tooth pressure of said ring gear.

4. In combination, a shaft member having an inner flange and an outer integral flange, said inner flange having a smaller diameter than the outer flange, splines on said inner flange, a ring gear piloted on said outer flange and having internal involute splines adapted to engage the splines on said inner flange, a plurality of spaced holes in said outer flange, fastening elements engaging said ring gear through said holes, said holes being larger than said elements whereby no shearing stress is applied to said elements.

5. In a drive axle, a drive shaft having a bevel pinion thereon, a shaft member having an inner and an outer flange, splines on one of said flanges, a ring gear having internal splines adapted to engage said splines and external teeth adapted to engage said bevel pinion, said ring gear being piloted on said outer flange at points substantially opposite the locus of engagement between said bevel pinion and said ring gear.

6. In combination, a rotatably mounted gear-supporting member having a cylindrical boss provided on its periphery with a plurality of splines, said supporting member also having a cylindrical portion providing a smooth peripheral piloting surface having a diameter considerably greater than that of said cylindrical boss, and a bevel gear disposed upon said supporting member and having a splined portion and a smooth portion cooperating respectively with said splines and said piloting surface, the toothed portion of said gear being so located that said piloting surface is disposed substantially midway between the inner and outer peripheries of the bevel teeth of said gear.

7. In combination, a rotatably mounted gear-supporting member having a radial flange provided on its periphery with a plurality of teeth, said member also having a portion provided with a smooth substantially cylindrical piloting periphery offset from said flange axially of the member and having a diameter very materially different from that of said flange, and a bevel gear surrounding said supporting member and having internal toothed and smooth portions complemental respectively to said toothed flange periphery and said piloting periphery, one of the latter being located opposite the centers of pressure of the bevel teeth of said gear,—that is, so that it will be intersected by lines drawn normal to the bevel gear teeth at points approximately midway between the tooth ends.

8. An assembly of the character described, comprising a rotatable member having a peripheral portion provided with a ring of involute splines and having another peripheral portion provided with a piloting surface located at a different distance radially from the axis of rotation, said portions being spaced apart slightly axially of the member, a bevel gear mounted on said member with lines intersecting its ring of bevel teeth normal to one of said portions, a series of complemental involute splines on said gear closely interlocked with said first mentioned involute splines, said gear also having a locating surface complemental to said piloting surface, and a circular ring of fastening elements arranged radially between said peripheral splined portion and said peripheral piloting portion for preventing axial separation of said member and said gear.

BEVERLY W. KEESE.